(No Model.) 2 Sheets—Sheet 2.
H. J. KREBS.
PROCESS OF AND APPARATUS FOR DISTILLING AMMONIA.
No. 583,262. Patented May 25, 1897.
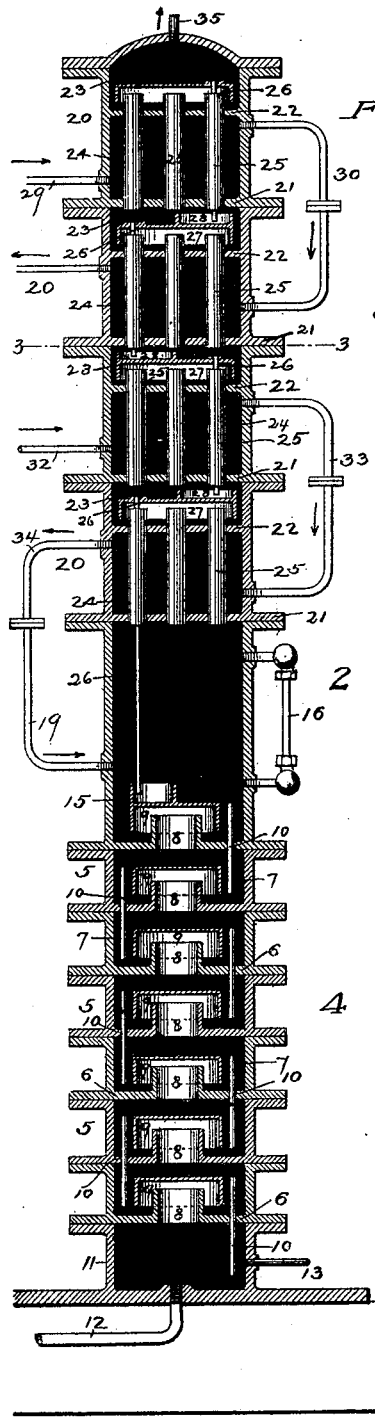
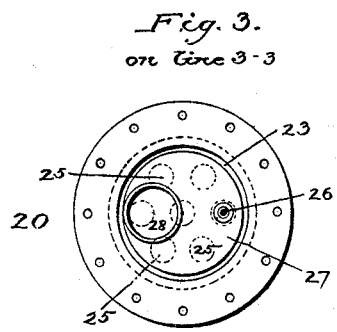
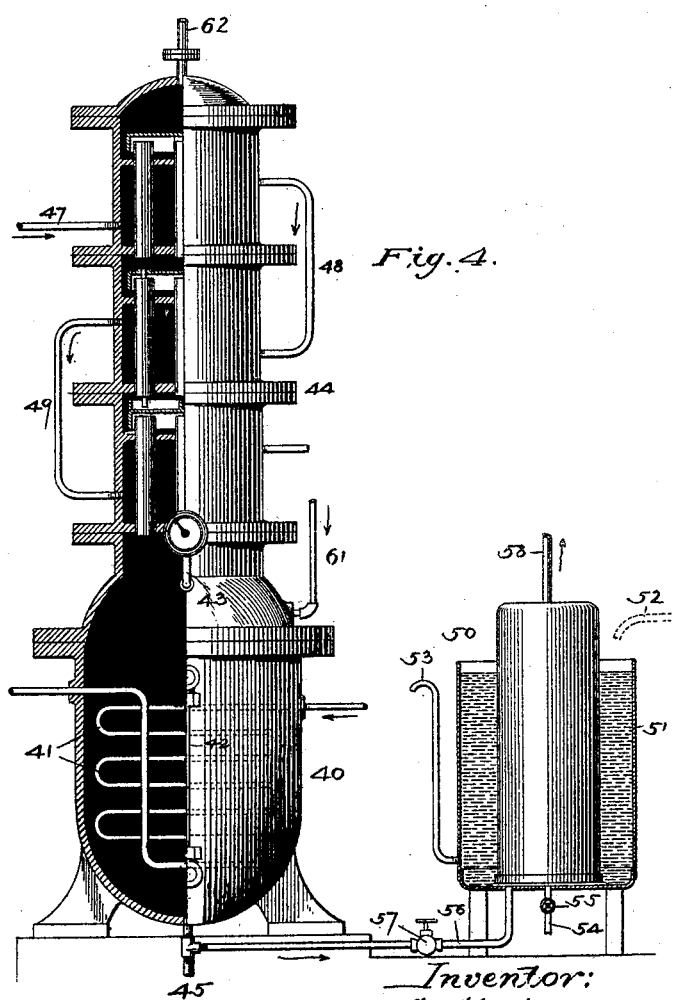
Witnesses:
Inventor:

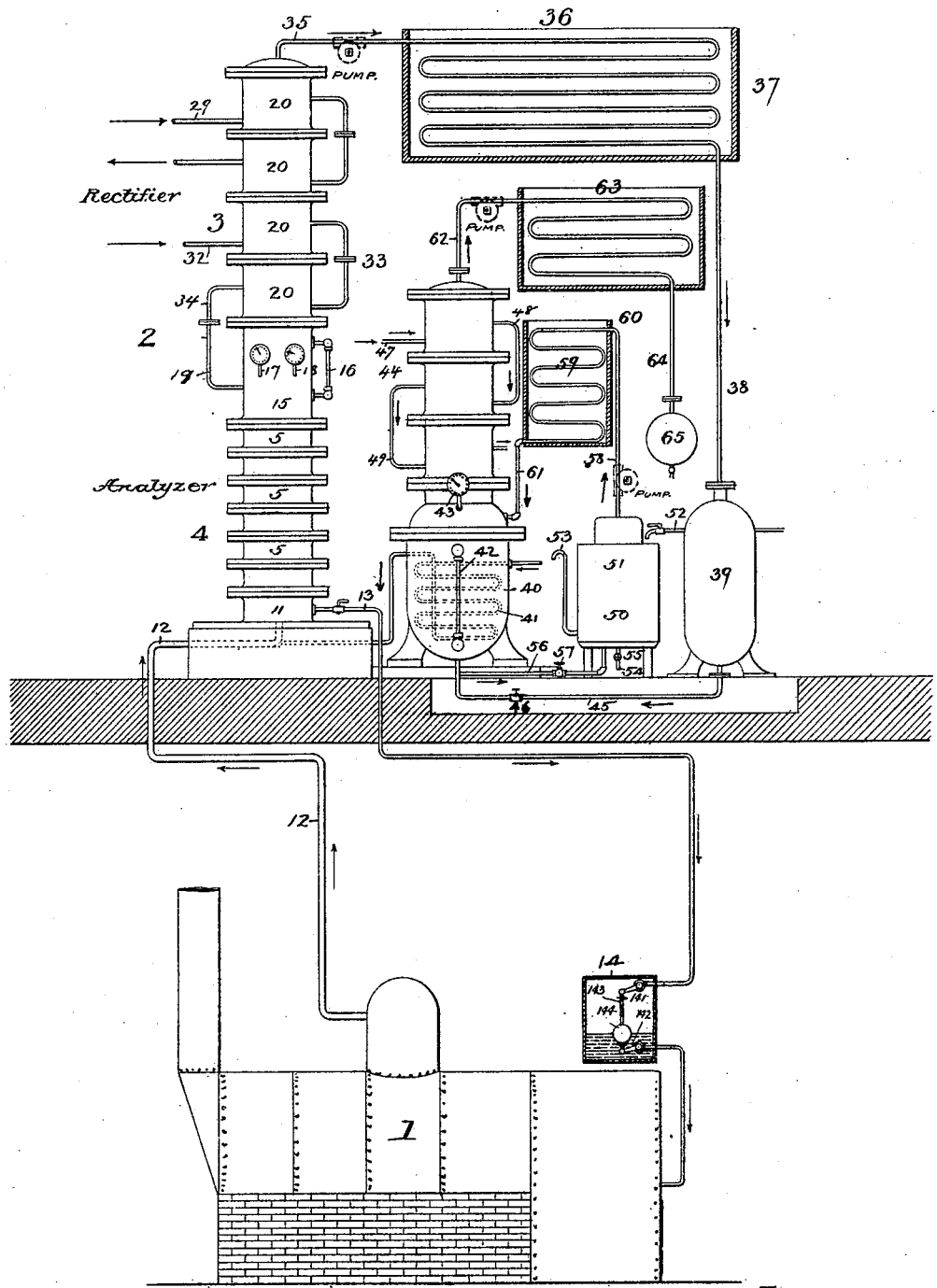

UNITED STATES PATENT OFFICE.

HENRIK J. KREBS, OF WILMINGTON, DELAWARE.

PROCESS OF AND APPARATUS FOR DISTILLING AMMONIA.

SPECIFICATION forming part of Letters Patent No. 583,262, dated May 25, 1897.

Application filed June 4, 1891. Serial No. 395,113. (No model.)

*To all whom it may concern:*

Be it known that I, HENRIK J. KREBS, of Wilmington, in the county of New Castle and State of Delaware, have invented certain Improvements in Processes of and Apparatus for Distilling Ammonia, of which the following is a specification.

My invention relates to processes of and apparatus for distilling, condensing, and purifying condensable gases under high pressures, and especially to such processes and apparatus when applied to the manufacture of anhydrous ammonia.

Heretofore anhydrous ammonia has been distilled from aqua-ammonia in low-pressure stills and the gaseous matter withdrawn therefrom and condensed by means of pumps. It has also been prepared by distillation under high pressure and after cooling liquefied in a receiver by the pressure maintained in the still.

By the means generally employed heretofore it has been found to be very difficult to free the ammonia completely from water and other impurities, such as hydrocarbon compounds, even when additional appliances were used, and except when the residual water was used for reabsorption of ammonia, as may be done when the operations are conducted in connection with absorption refrigerating apparatus and in like situations, there is serious loss due to imperfect distillation of the ammonia from the water.

The special objects of my invention are processes and apparatus by which from aqua-ammonia may be produced a pure article of condensed anhydrous ammonia at a minimum cost without material loss of ammonia in the residues and by which the operations may be carried on continuously. The separation of the ammonia from the water and from the impurities present is effected by a primary and a secondary or refining distillation and condensation, the refining distillation being effected at a lower temperature than the primary distillation, whereby the impurities remaining are entirely separated. The loss of ammonia in the residues of these distillations is prevented in the primary distillation by a return of the residue to the still in the form of steam to effect the distillation, and in the refining distillation loss is prevented by a redistillation of the residue, the product of such redistillation being returned to the body of the refining-still and the residue run off as waste. These operations may be carried on in any suitable or preferred form of apparatus constructed and operated upon either of the plans above referred to—that is, distillation may be produced at relatively low temperatures and pressures, the condensations being effected by means of pumps, or the distillations may be and preferably will be carried on at a temperature and pressure sufficient to effect the condensations of the ammonia.

In attaining the objects of my invention I have also devised certain improvements in the constructions and combinations of parts comprised in the apparatus, which will be hereinafter fully described and claimed, and which are also applicable to high or low pressure stills.

The process in its entirety, considered apart from any apparatus which may be employed, is as follows: The aqua-ammonia from which the ammonia is to be separated free from impurities is gradually heated to a temperature at which, at the pressure maintained, it will give off substantially all of its contained ammonia. This residue is then vaporized and returned in that condition through the solution of aqua-ammonia being treated, and by means of this vaporized water containing the residual ammonia I raise the aqua-ammonia to the desired temperature and separate the ammonia therefrom, the further separation of the ammonia from the watery vapor being effected by cooling and the reduction of the former to a liquid being effected by cooling and pressure. The liquid thus produced is refined or further purified by subjecting it to a much lower degree of heat, condensing the vapors so produced, subjecting the residuum of this distillation to a further distillation, and cooling and returning the vapors thus produced to the mass of impure ammonia. The condensed vapors forming the product of these distillations constitute a perfectly pure anhydrous ammonia.

In the accompanying drawings, Figure 1 represents the entire plant in elevation. Fig. 2 is a vertical section of the primary still. Fig. 3 is a horizontal section of the same on line 3 3, Fig. 2. Fig. 4 is an elevation, partly broken away and in section, of the refining-still and rectifying-column and the recovery-trap connected herewith.

In describing the construction and operation of the apparatus I will first point out its preferred form in which high temperatures and pressures are maintained in the stills and afterward point out the changes necessary to adjust to low pressures.

Referring to the drawings, 1 is a steam-generator of any ordinary or preferred construction and located in any convenient position and adapted to supply the necessary quantity of steam to the several parts of the apparatus in which it may be required, as hereinafter described, and to the various pumps and other engines which may be employed about the building.

2 is the still, composed of a rectifying-column 3 and an analyzer 4. The analyzer in general is of an ordinary construction, being formed of tubular sections 5, having floors 6, forming chambers or compartments 7, these chambers communicating with each other by vapor-pipes 8 extending from openings in the floors into the respective chambers 7 above and covered by sealing-caps 9. Each chamber 7 is also provided with an overflow-pipe 10, located at opposite sides in alternate chambers and extending from some distance above the floor of each chamber nearly to the bottom of the chamber below.

At the bottom of the analyzer 4 is the usual chamber 11 for receiving the drainage from the chambers above of the water freed as far as possible from ammonia and in which the live steam is admitted from pipe 12 in its floor for affecting the distillation of the ammonia. This chamber 11 is also provided with an outlet or drain pipe 13 through its side wall above the floor, which is connected with a trapped receptacle 14, which in turn is provided with a pipe connection with the boiler 1.

The pipe 13, leading into the receptacle 14, and the pipe leading from it, which in the construction shown connects with the steam-boiler 1, are each provided with a cock or valve 141 and 142, connected together by a rod 143, carrying a sliding float 144, so as to be operated, one to be open when the other is closed, by the rising and falling of the water. The cock in the outlet-pipe is closed when the receptacle is empty, and it remains in that position until the receptacle becomes filled, when a reverse action takes place and the receptacle is permitted to discharge itself. The receptacle 14, with its connected valved pipes, therefore constitutes a trapped discharge from the drainage-chamber 11.

As various devices of the same character are in common use for supplying feed-water to boilers, a particular description is unnecessary.

The uppermost section 15 of the analyzer 4 is of larger dimensions than those below it and is provided with a liquid-gage 16, a pressure-gage 17, and a thermometer 18, and it receives the aqua-ammonia to be distilled from pipe 19 through its side wall, said pipe 19 being shown as the continuation of another pipe 34, which will be hereinafter described.

The rectifying-column 3, superposed upon the analyzer 4, consists of a series of tubular sections 20, each having a floor 21 and a partition 22, thus forming, when placed in position, two chambers 23 and 24 in each section, the upper of the pairs of chambers being collecting-chambers for the condensed vapors and the lower being cooling-chambers for the circulation of a cooling medium around the pipes conveying the ascending vapors.

The uppermost section 15 of the analyzer is connected with the collecting-chamber 23 above it, and each collecting-chamber 23 is connected with each succeeding one by a series of vapor-pipes 25 and by the usual overflow-pipe 26. The vapor-pipes 25 pass through the intermediate cooling-chambers 24, each being tightly fitted in the floor and partition of the respective sections and extending a short distance above the partition forming the floor of the collecting-chamber into a sealing-cap 27, supported therein. The aggregate area of the cross-sections of these pipes should be such as to render the current of vapor slow through the cooling-chamber, and the size of each and their distance apart should be such that the cooling medium circulating through the chambers will effectually abstract the heat. The pipes are shown to be seven in number, six being arranged in a circle around a central pipe. In the drawings also, Figs. 2 and 3, is shown a convenient arrangement of the overflow-pipes 26. These pipes in the rectifying-column 3, as in the analyzer 4, are arranged at alternate sides of the alternate sections, and their upper ends pass through and are tightly fitted in the corresponding sealing-cap 27 and at a proper point to extend downward centrally through one of the vapor-tubes into the collecting-chamber beneath, in which it is provided with a liquid seal. By this construction the necessity of forming joints for the overflow-pipe in the partition and floor of each section is avoided, and at the same time the passage and cooling of the ascending vapors are not interfered with. For the purpose of forming a liquid seal for these overflow-pipes the sealing-caps 27 are provided on their upper surface with circular upwardly-extending flanges 28, forming cups in which the lower ends of the overflow-pipes dip.

The cooling-chambers 24 above referred to are each provided with means for admitting and discharging a cooling fluid, so as to maintain a constant circulation through each during the time that the apparatus is in operation. For this purpose I preferably provide the top cooling-chamber near the bottom at one side with a pipe 29, connected with a cold-water supply, and at the opposite side near the top of the chamber with an outlet-pipe 30. This pipe 30 extends downward and is connected on the same side with the cooling-chamber below near its bottom, the outlet-pipe for said chamber being connected near the top at the opposite side and is carried to any suitable point in the building for discharge. The pair of cooling-chambers located next below are provided with inlet and outlet pipes 32, 33, and 34, arranged in the manner above described; but as a cooling medium for these chambers I preferably employ the aqua-ammonia to be treated, said chambers thereby acting as "forewarmers." For this purpose the inlet-pipe 32 of the upper one of the pair of chambers is connected with the source of supply of the aqua-ammonia, which after passing through and abstracting the heat from the ascending vapors in the vapor-pipes is conveyed to the chamber below through pipe 33. In this chamber the aqua-ammonia is still further heated and is then carried by pipe 34 and delivered into pipe 19, through which it flows, as before described, into the uppermost chamber of the analyzer, where it first meets the ascending steam and vapors and is permitted to give off ammonia. By this construction and arrangement of pipes conducting the aqua-ammonia through the cooling-chambers and delivering it into the initial or receiving chambers of the analyzer the use of an exterior forewarmer, and the consequent use of heat derived from some other source, is avoided, and the incoming aqua-ammonia is applied to the cooling of the vapors at the point at which it will be most effective and where it will absorb the greatest quantity of heat.

While it will be found to be generally sufficient to employ four sections in the rectifying-column, a greater number may be employed, and in such cases the top and bottom cooling-chambers of the series using water will be provided with inlet and discharge pipes corresponding with pipes 29 and 32, all the chambers being connected by pipes corresponding to pipe 30. If more than two chambers are used, cooled by the aqua-ammonia, modifications will be made in the pipes similar to those above described. In other respects additional sections in the rectifying-column involve merely multiplication of the parts described.

In the analyzer the sections, except the top and bottom, are all alike and may be increased or reduced in number as may be deemed advisable.

From the domed top of the rectifying-column extends the pipe 35 for conveying the gaseous ammonia to the coil 36 of a condenser 37 of any ordinary or preferred construction, and from this condenser the ammonia is carried by pipe 38 to the receiver 39 for the liquefied ammonia.

The refining devices by which the impurities remaining in the liquid ammonia contained in receiver 39 are removed consist of a distilling-chamber 40, provided with a steam or hot-water coil 41 in its interior, liquid-gage 42, and pressure-gage 43 and surmounted by a rectifying-column 44. To the bottom of this chamber is connected the pipe 45, leading from the receiver 39 and provided with a stop-cock 46.

The rectifying-column 44 is formed of tubular sections having the same construction and parts as the rectifying-column above described, the cooling-chambers thereof being provided with a similar arrangement of cold-water-circulating pipes 47, 48, and 49.

Adjacent to the still 40 and rectifying-column 44 and forming a material part of the refining devices is the recovery-trap 50. This still 50 is a closed vessel surrounded by a hot-water jacket 51, supplied by pipe 52 and discharged by an overflow or siphon pipe 53. The still 50 is provided at its bottom with drainage-discharge pipe 54, normally closed by stop-cock 55, and with the inlet-pipe 56, provided with a suitable valve or cock 57, and connected at its opposite end with the bottom of the distilling-chamber 40. This pipe 56 may be connected directly to the distilling-chamber, or it may be conveniently connected, as shown, with the pipe 45, the desired communications being maintained by opening and closing the respective valves in the pipes. The recovery-still is also provided at its top with a vapor-outlet pipe 58, leading to a coil 59 of a condenser 60, the discharge-pipe 61 of said coil communicating with the upper portion of the distilling-chamber.

From the closed top of the rectifying-column 44 a vapor-conveying pipe 62 extends to the coil of a condenser 63, from which the purified ammonia is conducted under pressure by pipe 64 to the final receiver 65, from which it may be drawn off in a liquid condition for consumption.

In starting the apparatus steam is generated in boiler 1 and raised to a pressure slightly in excess of that at which anhydrous ammonia will liquefy at the temperature maintained in the condensers. Water is then turned on to the upper cooling-chambers 24 through pipe 29 and on to the condensers. The aqua-ammonia is then forced through the inlet-pipe 32 into the lower cooling-chambers 24 and passes thence into the uppermost section of the analyzer 4 through pipe 34. This chamber being filled above the mouth of the overflow-pipe, the aqua-ammonia descends into the section below, which, being filled to the proper height, supplies the next section, the chamber in each succeeding section being supplied in the same manner. The forcing of the aqua-ammonia through pipe 32 is continued until the liquid begins to be discharged through drain-pipe 13. At this time the overflow through the drain-pipe is cut off by turning the cock therein, the inflow of the ammonia is stopped, and steam from the boiler is admitted through pipe 12 to the drainage-chamber 11, which forces its way through the vapor-pipes 8, beneath the sealing-caps 9, and through the aqua-ammonia contained in each chamber, being itself partially condensed during its passage and gradually raising the temperature of the aqua-ammonia in the superposed sections of the analyzer, setting free the ammonia from the solution. This operation continues until the thermometer shows a temperature of about 220° Fahrenheit, when inflow of aqua-ammonia is again permitted. The still is now in full operation, the aqua-ammonia passing through the lower cooling-chambers of the rectifying-column abstracting the heat from the ascending vapors, the water and other condensable matters filling the collecting-chambers to the height of the overflow-pipes. At the same time the heat abstracted from the ascending vapors warms up the aqua-ammonia nearly to the temperature maintained in the receiving-chamber of the analyzer, so that it begins to give off the gaseous ammonia immediately on its introduction therein. The ascending vapors are further cooled in passing through the upper cooling-chambers in which cold water circulates, and a further condensation takes place, the liquid filling the collecting-chambers and passing downward through the sealed overflow-pipes into the chambers beneath, while the vapors, which are now nearly anhydrous ammonia, containing only a small percentage of impurities, pass along the pipe 35 through condenser 37, and under the pressure maintained in the still collect in receiver 39 in the form of a liquid.

As soon as liquid appears in the gage 16 the valve in drain-pipe 13 is opened, permitting the liquid collected in the drainage-chamber 11 to flow through it into receptacle 14. As the entrance of the steam is into the bottom of this drainage-chamber, and as the steam passes through the liquid contained therein, constantly agitating it, the temperature at this point being higher than it is elsewhere in the still, the temperature of the liquid gradually increasing from above downward, the liquid passing through drainage-pipe 13 will contain but little ammonia when the still is operating effectively; but in order to avoid loss in this way the construction above described is provided, by which this drainage liquid is forced from time to time as feed-water to the boiler. By this construction the ammonia contained in the drainage liquid is returned to the still in the form of vapor with the steam, and it is also a matter of economy, since the boiler thereby is supplied with very hot water. Means, of course, may be interposed between the receptacle 14 and the steam-generator to force the water into the generator below the water-line.

The liquid passing through the drainage-pipe consists not only of the water condensed from the inflowing steam, but also of water contained in the aqua-ammonia, and there will be therefore a greater amount of water passing through the drainage-pipe than is represented by the incoming steam. The steam used elsewhere in the building in driving pumps for other purposes will, however, under ordinary circumstances consume this surplus, and in any event the quantity of ammonia lost is reduced to a minimum. By forming a leak or telltale in the pipe 13 or other point in the course of the drainage liquid the operator can by the odor determine whether the still is operating properly.

A further advantage of the construction described, which is not dependent on the delivery of the drainage liquid into the boiler, is that by the delivery of the drainage through a trapped discharge the flow of the drainage liquid from the still may be continuous instead of intermittent, as usual, and by the arrangement of the steam and drain pipes described there will not be under proper conditions a material quantity of ammonia in the drainage. If an excess of ammonia should be contained in the drainage, its presence may be readily detected by smell and the temperature, pressure, or quantity of aqua-ammonia supplied regulated accordingly.

The liquid ammonia contained in the receiver 39 contains a small percentage of impurities, such as water, and when the ammonia is obtained, as usual, from gas liquor hydrocarbon compounds. To eliminate these impurities, suitable quantities of the liquid are delivered from time to time to the purifying portion of the apparatus by means of the pipe 45. The liquid ammonia delivered by this pipe is under a pressure such that it will liquefy at the temperature maintained in the condensers. Being at that pressure when delivered to the distilling-chamber, raising the temperature slightly will volatilize the ammonia and cause it to distil over through the rectifying-column and condenser and when cooled therein liquefy in the final receiver 65. For this reason I do not find it necessary to raise the temperature in this still above 100° Fahrenheit, and it will operate even at a lower temperature. The temperature in this distilling-chamber as compared with the pressure being so low the impurities contained in the liquid delivered to it will not volatilize, or if they do they will be condensed in passing through the chambers of the rectifying-column and finally be returned to the bottom of the still from the collecting-chambers. As the quantity of liquid contained in the still becomes reduced an additional quantity of the liquid ammonia is delivered to it from the receiver and the redistillation continues. After this purification has been continued for some time, say about eight (8) hours, and the still has been recharged several times some liquid impurities will have collected in the bottom of the still. This liquid will also contain ammonia, which should be recovered. To accomplish this recovery, the cock in pipe 56 is opened, permitting the liquid to flow into the recovery-still. If the parts are arranged as shown, this flow will take place by gravity until the level of the liquid in the two vessels is equal, and in such cases the cock in pipe 56 may remain open constantly except when the still is being charged through pipe 45, and the flow of the liquid from the distilling-chamber to the recovery-still will be constant. In this recovery-still the liquid will be heated by the hot-water jacket 51 to a temperature somewhat higher than is maintained in the adjacent still, (say 130° or 140° Fahrenheit,) and the ammonia contained in the liquid will separate in the form of a vapor and pass through pipe 58 and through condenser 60, from which it will pass in a liquid form into the upper portion of the distilling-chamber into the mass of liquid contained therein. By this arrangement if any of the impurities are carried over with the ammonia they will not pass into the purified anhydrous ammonia, but will be returned to the unpurified portion, passing finally back to the recovery-still.

When the impurities are believed to be sufficiently concentrated, communication through pipe 56 is shut off and the distillation in the recovery-still continued for a sufficient time to drive off the remaining ammonia, when the liquid is discharged through pipe 54, and it is found that the residuum so discharged may be so completely freed from the ammonia that it will not make frost.

If it should be found inconvenient to provide the distilling-chamber with sufficient heating-surfaces, devices, such as a coil, may be provided for heating the ammonia outside of the distilling-chamber, and since the temperature in these vessels is not high many of the ordinary means for heating may be conveniently employed.

In full lines in Fig. 1 of the drawings I have shown pumps interposed in pipes 35, 62, and 58, and any one or all of these pumps may be employed if it is deemed advisable to operate the stills at lower temperatures and pressures than have been specified herein. For instance, by the use of the pump in pipe 35 the temperature and pressure maintained in the primary still may be reduced to any degree found desirable. Also by the use of the pump in pipe 62 no additional heat need be imparted to the contents of the refining-still, or it may even be cooled down below the temperature of the surrounding atmosphere, the volatilization of the ammonia being effected by the reduction of pressure. It will also be obvious that by the use of the pump in pipe 58 there need not be a difference in temperatures between the refining-still and the recovery-still, but that it will be sufficient to maintain a difference in the pressures, but in that case free communication between the vessels through pipe 56 cannot be permitted.

Although these modifications or any one of them may be made in the apparatus without departing from my invention, I prefer to employ the form mainly shown and described.

Having thus described my invention, what I claim is—

1. The process of separating ammonia from aqueous solutions carrying it, which consists in generating steam in a suitable steam-boiler, discharging a current of the steam into a still containing an aqueous solution of ammonia, conveying away the ammonia-gas separated from the solution and returning the residual water from which all or most of the ammonia has been driven off and the condensed steam back to the steam-boiler whereby the boiler will be fed with very hot water and whatever ammonia is contained by the residual water in the still will be fed with it into the boiler and returned with the steam back to the still so that all loss will be prevented.

2. The process of continuously producing anhydrous ammonia which consists in continuously feeding an aqueous solution of ammonia into a suitable still, introducing a current of high-pressure steam into the solution, conveying away the gas driven off therefrom, cooling this gas to insure the condensation of aqueous and other impurities mixed therewith, producing thereby a more concentrated liquor, redistilling this concentrated liquor at low temperatures, and without introducing steam into the liquid collecting the unvaporized liquid in the bottom of this second still conducting them to a third still wherein they are subjected to a temperature somewhat higher than that of the second still, and recovering the gas driven off therein by conveying it back to the condensing apparatus appertaining to one of the other stills.

3. In an apparatus for making anhydrous ammonia, an analyzer, a steam pipe opening into or near the bottom thereof, a steam-boiler for supplying steam to the analyzer, a conduit through which an aqueous solution of ammonia is fed to the analyzer, an outlet-conduit for the gas and a conduit for conveying the condensed steam and residual water from which most or all of the ammonia has been driven from the analyzer to the boiler, all substantially as and for the purpose specified.

4. In an apparatus for making anhydrous ammonia, the combination with a refining-still of means for delivering liquid ammonia thereto, a recovery-still located adjacent to the refining-still, a conduit leading from near the bottom of the refining-still to the recovery-still for discharging the residuum from the refining-still into said recovery-still, a conduit-pipe for the vapor driven off from the recovery-still leading therefrom to a condensing apparatus which discharges into the refining-still.

5. In an apparatus for making anhydrous ammonia the combination with a refining-still having a rectifying-column connected therewith, and a conduit for delivering ammonia thereto, of a recovery-still located adjacent to the refining-still, a conduit leading from near the bottom of the refining-still to the recovery-still for discharging the residuum into the recovery-still, a conduit 58 for the vapor driven off from the recovery-still, a condenser for said vapor into which the conduit 58 leads, a pipe for conducting the product resulting from the condensation of the gas from the condenser into the main circuit, and means for heating the contents of both stills.

6. In an apparatus for making ammonia the combination of a primary still and a condenser for the gases discharged from the primary still with a refining-still into which the vapor partly or wholly condensed in the condenser is fed, a recovery-still, connections between the refining and recovery stills and a condenser in the connection which serves to convey vapor from the recovery to the refining still.

7. The combination of a still having a drainage-receiving chamber at the bottom, a steam-generator, a pipe connecting and transmitting steam from the generator into the drainage-chamber, and means connected with the drainage-chamber and with the steam-generator for delivering the drainage from the former into the latter substantially as described.

8. The combination with an analyzer having a drainage-chamber of a steam-boiler 1, a steam-pipe leading from the boiler and opening into the drainage-chamber near its bottom, a drainage-discharge pipe, a trap therein and a connection from the trap to the steam-boiler 1 substantially for the purpose specified.

In testimony whereof I hereunto set my hand, this 20th day of February, A. D. 1891, in the presence of two attesting witnesses.

HENRIK J. KREBS.

Witnesses:
J. JACKSON PEIRCE,
J. BAIL PEIRCE.